Sept. 15, 1964           A. B. TRENCH                3,149,255
                   ELECTRICAL RECIPROCATING MOTOR
Filed March 23, 1962                              2 Sheets-Sheet 1
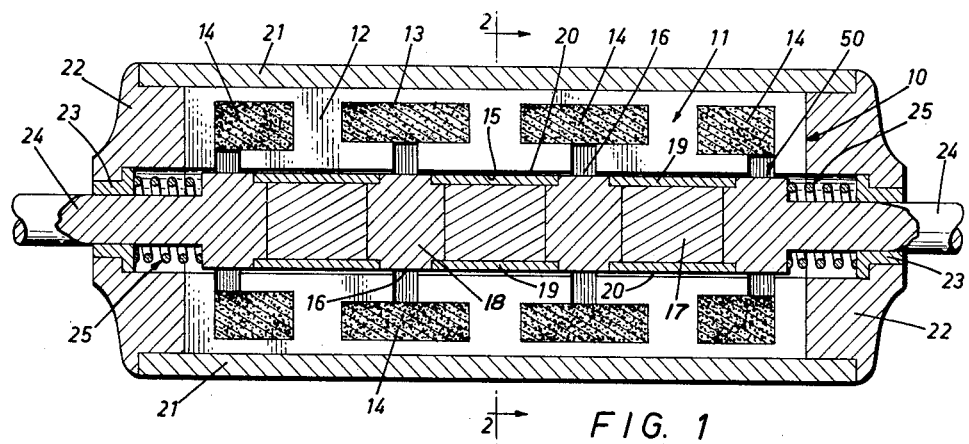
FIG. 1
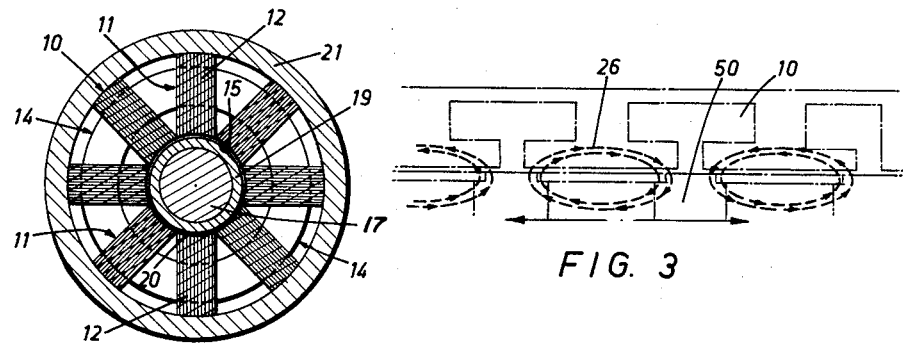
FIG. 2
FIG. 3
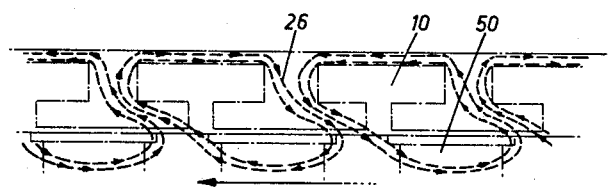
FIG. 4
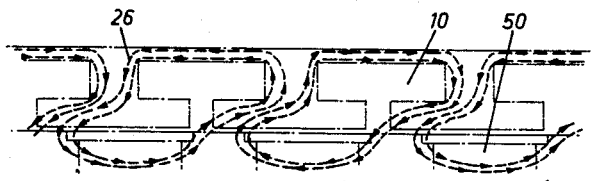
FIG. 5
ANTHONY B. TRENCH
INVENTOR.
BY
Attorney Sept. 15, 1964      A. B. TRENCH      3,149,255

ELECTRICAL RECIPROCATING MOTOR

Filed March 23, 1962      2 Sheets-Sheet 2

ANTHONY B. TRENCH
INVENTOR.

BY

Attorney

3,149,255
ELECTRICAL RECIPROCATING MOTOR
Anthony B. Trench, Galt, Ontario, Canada, assignor to
H & T Electrical Products, Toronto, Ontario, Canada
Filed Mar. 23, 1962, Ser. No. 183,326
20 Claims. (Cl. 310—30)

This invention relates to electromagnetic motors. More particularly, this invention relates to electromagnetic motors of the type having axially reciprocating armatures.

Electromagnetic axially reciprocating motors have been known for many years and can be classified into two types. One type of motor employs an armature having a coil or coils wound thereon. The other type employs an armature made of magnetizable material but having no coils. Axially reciprocating motors of the first type are shown in the following United States patents: 469,441, M. J. Wightman, issued February 23, 1892, and 2,444,134, H. H. Hittson, issued June 29, 1948. Axially reciprocating motors of the second type are shown in the aforementioned Patent No. 2,444,134, as well as in the following United States patents: 2,668,251, E. List, issued February 2, 1954, 2,248,110, T. J. Murphy, issued July 8, 1941, and 2,861,778, W. V. Spurlin, issued November 25, 1958.

An electromagnetic axially reciprocating motor embodying my invention represents a considerable departure, both in structure and advantages to be gained, from prior art types of axially reciprocating motors of the kind hereinbefore noted. In particular, in accordance with a preferred embodiment of my invention, the armature of my motor is made up of a plurality of permanent magnets spaced apart from each other along the length of the armature by pole pieces. The permanent magnets are arranged with like poles adjacent. An important feature of such an armature is the provision of electrically conductive short circuiting members such as copper sleeves, for example, surrounding each permanent magnet. The advantages of such an armature construction will become more apparent hereinafter.

Accordingly, it is one object of my invention to provide a new and improved armature for an electromagnetic device, the armature comprising at least two permanent magnets, a pole piece spacing each permanent magnet from an adjacent permanent magnet and electrically conductive short circuiting members each surrounding a different permanent magnet.

It is another object of my invention to provide a new and improved electromagnetic axially reciprocating motor.

It is a further object of my invention to provide a new and improved electromagnetic axially reciprocating motor employing the new and improved armature of the type hereinbefore mentioned.

Yet another object of my invention is to provide a new and improved electromagnetic axially reciprocating motor which utilizes a unique structure for obtaining a driving force on the armature thereof, by virtue of which the power output of the motor for a given weight of materials is greatly magnified.

In brief, an electromagnetic axially reciprocating motor embodying my invention comprises a generally tubular stator which has laterally spaced apart coils mounted therein and an armature which is coaxially mounted in the stator and spaced from the stator and the coils for reciprocating movement along the longitudinal axis of the stator. The stator is provided with high reluctance gaps between the surface of the stator which is adjacent the armature and the coils, so that the flux paths completely around the coils and in the stator are high reluctance paths. The armature comprises a plurality of permanent magnets laterally spaced from each other along the length of the armature by pole pieces and electrically conductive, non-magnetizable short circuiting members which surround the permanent magnets. The permanent magnets are arranged with like poles adjacent each other, and the pole pieces are positioned adjacent the high reluctance gaps.

My invention will become more apparent from the detailed description taken in conjunction with the drawings in which:

FIGURE 1 is a sectional side elevation of a motor embodying my invention;

FIGURE 2 is a section taken along line 2—2 in FIGURE 1 but through the whole motor;

FIGURE 3 shows certain flux paths in the stator and armature when the armature is in a neutral position;

FIGURES 4 and 5 show these flux paths when the armature is moved to a left and a right hand position respectively from the neutral position of FIGURE 3;

Stator Construction

Figure 6:
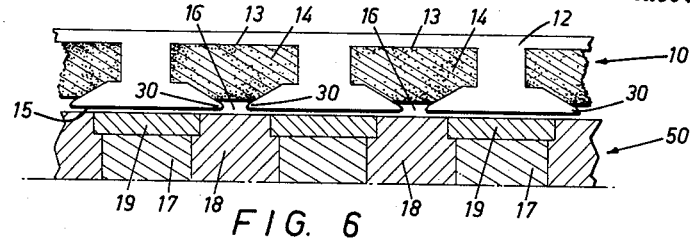
FIGURE 6 shows a part of the stator and armature of a motor embodying my invention and having saturated poles.

The stator construction of a motor embodying my invention is best seen with reference to FIGURES 1 and 2. The stator 10 consists of groups 11 of steel laminations 12 disposed in a cylindrical array about the longitudinal axis of the motor. Each lamination 12 is a thin steel punching which is arranged with its width radial to the longitudinal axis of the motor and its length parallel to this axis. Provided in stator 10 are a number of spaced apart coil receiving compartments 13 in each of which is positioned a wound coil 14, coils 14 being serially connected together. It will be noted that stator 10 is generally tubular in shape, and that the inner edges of laminations 12 define a surface 15 which in turn defines an armature receiving opening. Between the inner surface 15 of stator 10 and each coil receiving compartment 13 and coil 14 there is a high reluctance air gap 16. Thus it will be appreciated that the flux path around each coil 14 in stator 10 is a high reluctance path. Stator 10 is made in a conventional manner by butt or lap joining laminations 12 in a manner similar to that used for joints in transformer cores.

Armature Construction

The construction of one armature embodying my invention is best seen by referring to FIGURE 1 where I have shown a plurality of cylindrical permanent magnets 17 which are laterally spaced apart from each other along the length of the armature 50 by cylindrical pole pieces 18 made of iron having a high permeability. Permanent magnets 17 are arranged along the length of the armature with like poles adjacent each other. Surrounding each permanent magnet 17 is an electrically conductive, non-magnetizable short circuiting member 19 which, in the form illustrated, is a thick walled sleeve made of copper. Sleeves 19 may be secured to pole pieces 18 by means such as brazing, silver soldering, threading etc. to form a rigid cylindrical armature 50.

Motor Construction

The motor construction of a preferred embodiment of my invention is best seen with reference to FIGURES 1 and 2 where it will be noted that armature 50 is coaxially mounted in stator 10 and is spaced from inner surface 15 of stator 10 by a small, annular, air gap 20. Stator 10 is housed in a tubular casing 21 to which is secured at each end end bells 22 having apertures therein which carry bearings 23. The shafts 24 of the motor extend through and are rotatably mounted in bearings 23, the shafts 24 being integral with the end ones of pole pieces 18. Positioned between the end pole pieces 18 and bearings 23 are compression springs 25 which urge armature 50 to a neutral position and which are selected to be in resonance with the armature during operation of the motor.

It is important to note that when armature 50 is in the neutral position, as is shown in FIGURES 1 and 3, pole pieces 18 overlap high reluctance gaps 16 equally on either side of the gaps. As will become more apparent hereinafter, when pole pieces 18 are so positioned, axial movement of the armature to the left or to the right will not alter the permeance of the air gap between stator 10 and armature 50 in the flux path of each permanent magnet 17.

*Generator Action*

In FIGURE 3 armature 50 is shown in the neutral position, and the arrows 26 indicate the direction of magnetic flux produced by permanent magnets 17. It is assumed that serially connected coils 14 are not energized, and it will be seen that the magnetic flux flows in symmetrical paths through the armature 50 and the stator laminations 12 in such a manner that the flux from permanent magnets 17 does not link any of coils 14.

When the armature 50 is moved to the left, as shown in FIGURE 4, it will be seen that the magnetic flux links coils 14. Similarly, if the armature is moved to the right, as is shown in FIGURE 5, the magnetic flux from permanent magnets 17 links coils 14, but the flux linking any coil 14 in FIGURE 5 is opposite in direction to the flux linking the same coil in FIGURE 4.

It should be noted that during movement of armature 50 from the neutral position of FIGURE 3 to either of the positions shown in FIGURES 4 and 5, the flux from each permanent magnet 17 does not change in either direction or magnitude because of the constant permeance of the air gap 20 between the armature and the stator in the flux path of each permanent magnet 17. The permeance of this air gap remains constant, because the gap area as seen by the magnetic flux from the permanent magnets increases on one side of a coil 14 as it is decreased by the same amount on the other side of the coil 14, this being due to the overlap of pole pieces 18 equally on either side of high reluctance gaps 16. Consequently, during armature movement a constant total gap area is presented to the flux from any one of permanent magnets 17.

When armature 50 is made to oscillate axially, the magnetic flux from each permanent magnet 17 will alternate around each coil 14 as shown in FIGURES 3 to 5 inclusive. Consequently, by Faraday's law of induction, an E.M.F. will be induced in coils 14, which E.M.F. will alternate in synchronism with the oscillation of the armature. Since this induced E.M.F. will be substantially proportional to the velocity of the armature, it will be sinusoidal for sinusoidal motion of the armature. Therefore, by connecting coils 14 in series with the induced E.M.F.'s additive, the device will act as an alternating current electric generator.

*Motor Action*

It now remains to be considered what will happen when stator coils 14 are connected in series and are connected to an alternating current supply. It will be appreciated, of course, that to effect this the two free leads of the outside coils 14 will be brought out through casing 21 in a conventional manner. When an alternating current is caused to flow through the serially connected coils 14, the current which will appear in the coils will cause armature 50 to oscillate in synchronism with the supply voltage. The armature will attempt to move axially back and forth with such a speed as to induce in coils 14 an equal and opposite voltage to that which is supplied to coils 14. This opposing voltage will appear as a result of the generator action hereinbefore described. Consequently, the device is now acting as an axially reciprocating motor, and mechanical power may be transmitted externally by way of shafts 24. Springs 25, if selected to be in resonance with the armature under operating conditions, will assist in the motion of the armature and in the efficient conversion of electrical to mechanical power.

*General*

An alternative embodiment of my invention is shown in part in FIGURE 6, the only difference between the motor of FIGURE 6 and that shown in FIGURE 1 being that the pole pieces 30 which define high reluctance gaps 16 are designed in such a manner that they are just below saturation when the motor is operating under no load conditions.

Figure 7:
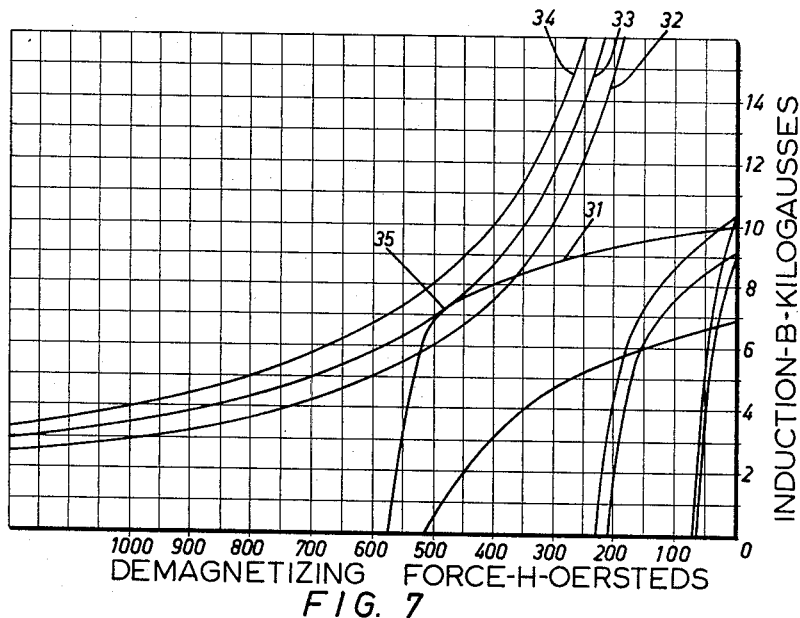
FIGURE 7 is a graph showing the demagnetization and energy product curves of commercially available permanent magnets.

An alternative embodiment of my invention is shown in FIGURE 7. In this embodiment there is only one coil receiving compartment 13, one coil 14, one high reluctance gap 16 and two permanent magnets 17, each enclosed in a sleeve 19, and which are separated by a pole piece 18, the latter overlapping gap 16 equally on both sides thereof when armature 50 is in the neutral position, as in the case of the motor shown in FIGURE 1. Pole pieces 18 to which shafts 24 are secured also are provided at each end of armature 50. The embodiment of my invention shown in FIGURE 7 also has poles 30 which operate just below the saturated point thereof when the motor is operating under no load conditions. As in the case of FIGURE 1, permanent magnets 17 are arranged with a like pole adjacent.

Figure 9:
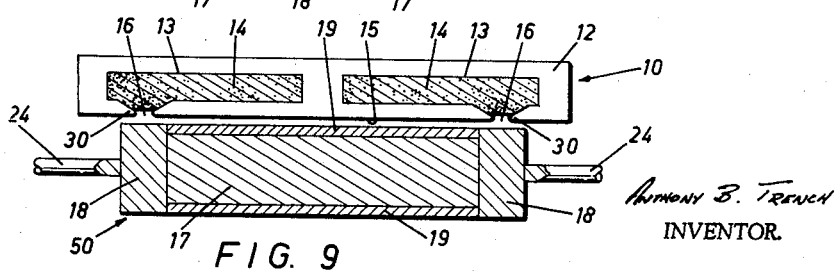

Another embodiment of my invention is shown in part in FIGURE 9 and comprises a stator 10 having two laterally spaced apart coil receiving compartments 13 each having a coil 14 therein, the latter being serially connected together. Two high reluctance air gaps 16 are provided each being defined by poles 30 which operate magnetically just below the saturation point when the motor is operating under no load conditions. In the case of this embodiment of my invention, the armature 50 has only one permanent magnet 17, a pole piece 18 being positioned on each end of permanent magnet 17, shafts 24 being connected to these pole pieces. As in the case of the previous embodiments, permanent magnet 17 is surrounded by a short circuiting sleeve 19. Again it will be noted that pole pieces 18 are opposite high reluctance gaps 16, and that these pole pieces overlap gaps 16 equally on either side thereof when the armature is in the neutral position.

In FIGURE 7 I have shown the B-H curves of a number of permanent magnets. The curve numbered 31 is the curve of the permanent magnet 17 which I employ in practising my invention. Curves 32, 33 and 34 are energy product curves, the energy product being $B_d H_d \times 10^6$ where $H_d$ is the demagnetizing force and $B_d$ is the remnant induction. Since the maximum energy product for curve 31 occurs at point 35, it is preferable that a motor embodying my invention be designed such that it will always operate magnetically at point 35. This is achieved partly by making pole pieces 18 overlap high reluctance gaps 16 equally on both sides thereof, but it is mainly achieved by the use of short circuiting sleeves 19. Sleeves 19 serve the two-fold purpose of preventing permanent magnets 17 from being subjected to severe demagnetizing forces which would cause the permanent magnets to rapidly lose their effect and, in the case where saturated poles 30 are employed, also play a very important role in strengthening the driving force on the armature 50. It is well known that the magnetization curve of permanent magnets is not reversible but follows a loop. A momentary demagnetizing force on a permanent magnet, and of sufficient strength to depress the magnetic induction below point 35 on curve 31, will cause the magnetic induction to remain severely depressed. However, in accordance with my invention, any tendency for flux from coil 14 to demagnetize permanent magnets 17 is resisted by short circuiting sleeves 19, because, during movement of these sleeves in the flux from coils 14, currents are induced and flow in sleeves 19, these currents producing a flux which is not only opposed to the flux from coils 14, but also is in a direction to assist the flux from permanent magnets 17. Thus, any tendency for permanent magnets 17 to become demagnetized by virtue of flux from coils 14 is immediately resisted by the induced currents which result and which flow in short circuiting sleeves 19.

Figure 8:
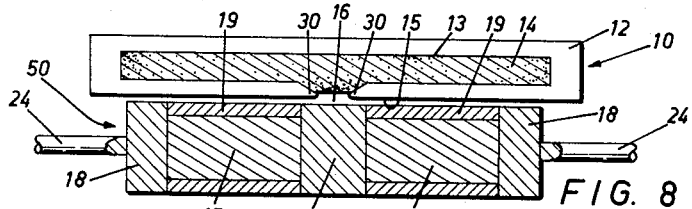
FIGURES 8 and 9 depict in section the armature and part of the stator of two alternative embodiments of my invention.

In the case of the embodiments of my invention shown in FIGURES 6, 8 and 9, the material used in laminations 12 is selected to have a characteristic magnetization curve with a sharply defined saturation point, and the poles 30 of stator 10 are designed to operate magnetically just below the saturation point of the poles during no load conditions. Under these circumstances, the magnetic flux from permanent magnets 17 finds relatively low reluctance paths through stator 10 under no load conditions. However, when a load is applied to the motor, the back E.M.F. of coils 14 attempts to force additional flux through the already nearly saturated poles 30, the natural result of which is that saturation of poles 30 immediately occurs, and a great excess of magnetizing force appears from coils 14 and is utilized in producing additional driving force on the armature 50. The magnetizing force is proportional to the number of ampere turns of coils 14, and under the aforementioned conditions the ampere turns increase substantially. The force driving the armature is proportional to the number of ampere turns in coils 14 multiplied by the magnetic energy product of permanent magnets 17 and the large induced currents flowing in sleeve members 19.

During the aforementioned process the magnetic flux from permanent magnets 17 is not depressed, but, as aforementioned, remains at substantially full strength by virtue of the induced currents in short circuiting sleeves 19. From the foregoing it will be seen that the driving force on the armature in the case of the embodiments of my invention shown in FIGURES 6, 8 and 9 is multiplied several times over the driving force obtainable with the embodiment of my invention shown in FIGURE 1 which does not utilize stator poles which operate just below saturation when the motor is operating under no load conditions.

It should be noted that even if permanent magnets that resist demagnetization become available, sleeves 19 will still perform an important function, as their action is to maintain and force the magnetic flux from magnets 17 to occupy the nearly saturated path through pole pieces 30 and so block flux from coils 14. This is the effect which results in a great increase of driving force on armature 50.

While I have described certain preferred embodiments of my invention, it will be appreciated by those skilled in the art that various changes, alterations and modifications may be made thereto without departing from the spirit and scope of my invention.

What I claim as my invention is:

1. An electromagnetic axially reciprocating motor comprising a generally tubular stator having laterally spaced apart coils mounted therein and an armature coaxially mounted in said stator and spaced from said stator and said coils for reciprocating movement along the longitudinal axis of said stator, said stator being provided with high reluctance gaps between the surface of said stator adjacent said armature and said coils, whereby the flux paths completely around said coils and in said stator are high reluctance paths, said "reciprocable armature comprising (a) a plurality of permanent magnets, (b) a plurality of pole pieces, and (c) a plurality of electrically conductive, non-magnetizable, short circuiting members, said permanent magnets being laterally spaced apart from each other along the axis of reciprocation of said armature by said pole pieces, said permanent magnets being arranged with like poles adjacent each other, said short circuiting members surrounding said permanent magnets and being adapted to short circuit currents induced in said short circuiting members by virtue of the movement of said short circuiting members in the flux created by said coils, said armature being reciprocable from a neutral position to right and left-hand positions, in said neutral position of said armature, said pole pieces being positioned adjacent said high reluctance gaps.

2. The invention according to claim 1 wherein said pole pieces overlap said gaps in the neutral position of said armature.

3. The invention according to claim 1 wherein in the neutral position of said armature said pole pieces overlap said gaps equally on either side of said gaps.

4. The invention according to claim 1 wherein said electrically conductive, non-magnetizable short circuiting members are tubular sleeves.

5. An electromagnetic axially reciprocating motor comprising a generally tubular stator having laterally spaced apart coils mounted therein and an armature coaxially mounted in said stator and spaced from said stator and said coils for reciprocating movement along the longitudinal axis of said stator, said stator being provided with high reluctance gaps between the surface of said stator adjacent said armature and said coils, whereby the flux paths completely around said coils and in said stator are high reluctance paths, said reciprocable armature comprising (a) a plurality of permanent magnets, (b) a plurality of pole pieces, and (c) a plurality of electrically conductive, non-magnetizable, short circuiting members, said permanent magnets being laterally spaced apart from each other along the axis of reciprocation of said armature by said pole pieces, said permanent magnets being arranged with like poles adjacent each other, said short circuiting members surrounding said permanent magnets and being adapted to short circuit currents induced in said short circuiting members by virtue of the movement of said short circuiting members in the flux created by said coils, said armature being reciprocable from a neutral position to right and left-hand positions, in said neutral position of said armature, said pole pieces being positioned adjacent said high reluctance gaps, in each position of said armature between said right-hand and said left-hand positions the permeance of the gaps between said stator and said armature in the flux path of each of said permanent magnets being at least substantially constant in each of said flux paths of said permanent magnets.

6. The invention according to claim 5 wherein the portions of said stator adjacent said high reluctance gaps form pole tips, said pole tips being nearly saturated under no load conditions.

7. The invention according to claim 1 including bearings secured to said stator at each end thereof, said armature being mounted in said bearings, and compression spring means mounted at each end of said armature and urging said armature to a neutral position, said springs being in resonance with said armature.

8. An electromagnetic axially reciprocating motor comprising a generally tubular stator having laterally spaced serially connected coils each mounted in a different coil receiving compartment in said stator and a generally cylindrical armature coaxially mounted in said stator and spaced from said stator and said coils for reciprocating movement along the longitudinal axis of said stator, said stator being provided with a plurality of annular high reluctance gaps at the side of said stator adjacent said armature, one of said annular gaps being provided for each of said coils and each of said annular gaps extending from the inner surface of said stator adjacent said armature to a different one of said coil receiving compartments, whereby the flux paths completely around said coils and in said stator are high reluctance paths, said reciprocable armature comprising (a) a plurality of generally cylindrical permanent magnets, (b) a plurality of generally cylindrical pole pieces and (c) a plurality of electrically conductive, non-magnetizable short circuiting members, said permanent magnets being laterally spaced from each other along the axis of reciprocation of said armature by said pole pieces, said permanent magnets being arranged with like poles adjacent each other, said electrically conductive, non-magnetizable short circuiting members each surrounding a different one of said permanent magnets, and being adapted to short circuit currents induced in said short circuiting members by virtue of the movement of said short circuiting members in the flux created by said coils, said armature being reciprocable from a neutral position to right and left-hand positions, in said neutral position of said armature said pole pieces being positioned adjacent said high reluctance gaps.

9. An electromagnetic axially reciprocating motor comprising a generally tubular stator having laterally spaced serially connected coils each mounted in a different coil receiving compartment in said stator, and a generally cylindrical armature coaxially mounted in said stator and spaced from said stator and said coils for reciprocating movement along the longitudinal axis of said stator, said stator being provided with a plurality of annular high reluctance gaps at the side of said stator adjacent said armature, one of said annular gaps being provided for each of said coils and each of said annular gaps extending from the inner surface of said stator adjacent said armature to a different one of said coil receiving compartments, whereby the flux paths completely around said coils and in said stator are high reluctance paths, said armature comprising (a) a plurality of generally cylindrical permanent magnets, (b) a plurality of generally cylindrical pole pieces and (c) a plurality of electrically conductive, non-magnetizable short circuiting members, said permanent magnets being laterally spaced from each other along the axis of reciprocation of said armature by said pole pieces, said permanent magnets being arranged with like poles adjacent each other, said electrically conductive, non-magnetizable short circuiting members each surrounding a different one of said permanent magnets and being adapted to short circuit currents induced in said short circuiting members by virtue of the movement of said short circuiting members in the flux created by said coils, said armature being reciprocable from a neutral position to a right-hand position and from said neutral position to a left-hand position, in said neutral position of said armature said pole pieces being positioned adjacent said high reluctance gaps, in each position of said armature between said right-hand and said left-hand positions the permeance of the gaps between said stator and said armature in the flux path of each of said permanent magnets being substantially constant in each of said flux paths of said permanent magnets.

10. An electromagnetic axially reciprocating motor comprising a generally tubular stator having two laterally spaced apart coils mounted therein, and an armature coaxially mounted in said stator and spaced from said stator and said coils for reciprocating movement along the longitudinal axis of said stator, said stator being provided with high reluctance gaps between the surface of said stator adjacent said armature and said coils, whereby the flux paths completely around each coil and in said stator are high reluctance paths, said armature comprising (a) a permanent magnet, (b) a pole piece at each end of said permanent magnet and (c) an electrically conductive, non-magnetizable short circuiting member surrounding said permanent magnet, said short circuiting member being adapted to short circuit currents induced therein by virtue of reciprocating movement of said short circuiting member in the flux created by said coils, said armature being reciprocable from a neutral position to right and left-hand positions, said pole pieces being adjacent said high reluctance gaps in said neutral position of said armature.

11. The invention according to claim 10 wherein said pole pieces overlap said gaps in the neutral position of said armature.

12. An electromagnetic axially reciprocating motor comprising a generally tubular stator having two laterally spaced apart coils mounted therein, and an armature coaxially mounted in said stator and spaced from said stator and said coils for reciprocating movement along the longitudinal axis of said stator, said stator being provided with high reluctance gaps between the surface of said stator adjacent said armature and said coils, whereby the flux paths completely around each coil and in said stator are high reluctance paths, said armature comprising (a) a permanent magnet, (b) a pole piece at each end of said permanent magnet and (c) an electrically conductive, nonmagnetizable short circuiting member surrounding said permanent magnet, said short circuiting member being adapted to short circuit currents induced therein by virtue of reciprocating movement of said short circuiting member in the flux created by said coils, said armature being reciprocable from a neutral position to right and left-hand positions, said pole pieces being adjacent said high reluctance gaps in said neutral position of said armature, in each position of said armature between said right-hand and said left-hand positions the permeance of the gaps between said stator and said armature in the flux path of said permanent magnet being substantially constant.

13. The invention according to claim 12 wherein said electrically conductive, non-magnetizable short circuiting member is a tubular sleeve.

14. The invention according to claim 12 wherein the portions of said stator adjacent said high reluctance gaps form pole tips, said pole tips being nearly saturated under no load conditions.

15. An electromagnetic axially reciprocating motor comprising a generally tubular stator having a coil mounted therein, and an armature coaxially mounted in said stator and spaced from said stator and said coil for reciprocating movement along the longitudinal axis of said stator, said stator being provided with a high reluctance gap between the surface of said stator adjacent said armature and said coil, whereby the flux path completely around said coil and in said stator is a high reluctance path, said armature comprising (a) two permanent magnets, (b) a pole piece and (c) two electrically conductive, non-magnetizable short circuiting members, said permanent magnets being laterally spaced apart from each other along the axis of reciprocation of said armature by said pole piece, said permanent magnets being arranged with like poles adjacent each other, said short circuiting members surrounding respective ones of said permanent magnets and being adapted to short circuit currents induced in said short circuiting members by virtue of movement of said short circuiting members in the flux created by said coil, said armature being reciprocable from a neutral position to a right and a left-hand position, in said neutral position of said armature, said pole piece being adjacent said high reluctance gap.

16. The invention according to claim 15 wherein said pole piece overlaps said gap in the neutral position of said armature.

17. An electromagnetic axially reciprocating motor comprising a generally tubular stator having a coil mounted therein, and an armature coaxially mounted in said stator and spaced from said stator and said coil for reciprocating movement along the longitudinal axis of said stator, said stator being provided with a high reluctance gap between the surface of said stator adjacent said armature and said coil, whereby the flux path completely around said coil and in said stator is a high reluctance path, said armature comprising (a) two permanent magnets, (b) a pole piece and (c) two electrically conductive, non-magnetizable short circuiting members, said permanent magnets being laterally spaced apart from each other along the axis of reciprocation of said armature by said pole piece, said permanent magnets being arranged with like poles adjacent each other, said short circuiting members surrounding respective ones of said permanent magnets and being adapted to short circuit currents induced in said short circuiting members by virute of movement of said short circuiting members in the flux created by said coil, said armature being reciprocable from a neutral position to a right and a left-hand position, in said neutral position of said armature said pole piece being adjacent said high reluctance gap, in each position of said armature between said right-hand and said left-hand positions the permeance of the gaps between said stator and said armature in the flux path of each of said permanent magnets being substantially constant in each of said flux paths of said permanent magnets.

18. The invention according to claim 17 wherein said electrically conductive, non-magnetizable short circuiting members are tubular sleeves.

19. The invention according to claim 17 wherein the portions of said stator adjacent said high reluctance gap form pole tips, said pole tips being nearly saturated under no load conditions.

20. An armature for a reciprocating electromagnetic device, said armature comprising at least two permanent magnets, a pole piece spacing each of said permanent magnets from an adjacent one of said permanent magnets, said permanent magnets and said pole pieces being arranged alternately along the longitudinal axis of said armature with a like pole of each of said permanent magnets adjacent, and electrically conductive, non-magnetizable short circuiting members each surrounding a different one of said permanent magnets and adapted to short circuit currents induced in said short circuiting members by virtue of movement of said short circuiting members in a flux during the reciprocation of said armature in said flux.

References Cited in the file of this patent

UNITED STATES PATENTS

| | | |
|---|---|---|
| 2,167,078 | Lakatos | July 25, 1939 |
| 2,248,110 | Murphy | July 8, 1941 |
| 2,488,437 | Schaefer | Nov. 15, 1949 |
| 2,525,456 | Merrill | Oct. 10, 1950 |
| 2,626,367 | Beymer | Jan. 20, 1953 |